Jan. 5, 1943. S. O. HUNTINGTON 2,307,506
HYDRAULIC COUPLING
Filed Oct. 22, 1940
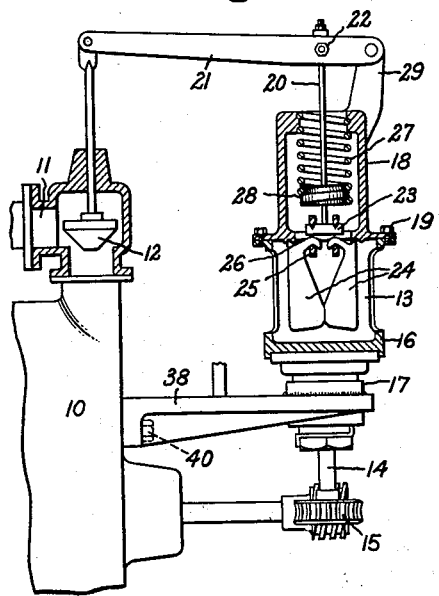
Inventor:
Sidney O. Huntington,
by Harry E. Dunham
His Attorney.

Patented Jan. 5, 1943

2,307,506

UNITED STATES PATENT OFFICE 2,307,506

HYDRAULIC COUPLING

Sidney O. Huntington, Scotia, N. Y., assignor to General Electric Company, a corporation of New York Application October 22, 1940, Serial No. 362,213

8 Claims. (Cl. 64—26)

The invention relates to hydraulic couplings for transmitting torque between a driving and a driven element through an incompressible fluid such as oil. Such hydraulic couplings are used whenever it is desirable to reduce the effects of sudden speed changes from the driving element onto the driven element and also to permit slight misalignment between the driving and driven elements.

The object of my invention is to provide an improved construction and arrangement of hydraulic couplings which are simple in design and may be produced at comparatively low cost.

For a consideration of what I believe to be novel and my invention, attention is directed to the following description and the claims appended thereto in connection with the accompanying drawing.

In the drawing Fig. 1 illustrates an arrangement embodying my invention; Fig. 2 is an enlarged sectional view of a part of Fig. 1; Fig. 3 is a section along line 3—3 of Fig. 2; and Fig. 4 is a section along line 4—4 of Fig. 2.

In the example illustrated in the drawing, I have shown a coupling arrangement according to my invention in combination with a speed governing mechanism including a speed governor driven by a machine to be controlled in response to speed changes. In arrangements of this kind it is desirable to prevent sudden small speed changes, that is, minor fluctuations of speed, from being transmitted onto the elements to be controlled in response to speed changes.

With reference to the drawing, the arrangement comprises an elastic fluid turbine 10 having an inlet conduit 11 with an admission valve 12 for controlling the flow of elastic fluid to the turbine. The valve 12 is controlled by a speed governing mechanism including a speed governor 13 having a drive shaft 14 driven from the turbine shaft through a gearing 15. The governor has a lower bracket 16 connected at its lower end to the drive shaft 14 through a hydraulic coupling 17 and at its upper end to an upper bracket 18 by means of a plurality of bolts 19. The two brackets 16 and 18 are rotatably arranged and serve to carry the various rotatable governor elements. These elements include a governor spindle 20 which at its upper end is connected to a governor lever 21 by means including a nut 22. The lower end of the spindle carries a support 23 for flyweights 24 which are connected to the support by knife-edged links 25. The flyweights have knife edges 26 supported on knife-edge bearings formed by the upper bracket 18. The spindle is forced upward by means of a tensioned governor spring 27 connected between a plug 28 on the spindle and the upper end of the bracket 18. The governor spring biases the flyweights towards their central position against centrifugal force during operation. A more detailed description of this general type of governor is found in the patent to E. Sheppard No. 2,151,569, filed June 8, 1937, and assigned to the same assignee as the present application. The right-hand end of the governor lever 21 is held on a fulcrum 29 while the left-hand end of the lever 21 is pivotally connected to the admission valve 12. During operation the admission valve 12 is positioned by the governing mechanism in response to speed changes. Servo motors or other known torque amplifying means usually arranged between the governor lever and the valve 12 have been omitted for the sake of simplicity.

The hydraulic coupling 17 comprises a cylindrical casing 30 which has an upper end portion provided with a flange 31 and secured to the bottom of the lower bracket 16 by a plurality of screws 32. The casing is formed with a bore 33 enlarged at its upper end to form an annular recess 34. The casing 30 is supported by a bearing having a backing 35 and bearing lining 36 secured to the backing 35. The bearing in turn is held on a cylindrical supporting member 37 fused to a bracket 38. A ring 39 suitably fastened to the lower end of the casing 30 retains the latter on the bearing, preventing axial movement between them. The bracket 38 in the present example is bolted to the casing of the turbine 10 by bolts 40. The drive shaft 14 projects through and has sliding fit with the bore 33 of the coupling casing 30. An upper enlarged end portion or head 41 of the drive shaft 14 projects into the annular recess 34, contacting the lower surface of the bracket 16 and held against downward movement by a thrust bearing 42 on the casing 30. Two segments 43 and 44 are secured in opposite portions of the annular recess 34 of the casing by means of a plurality of screws 45. With the segments 43 and 44 the casing forms a cylindrical bore with diametrically opposite recesses extending from the bore. The head 41 is machined to form a groove 46 across a diameter for accommodating a bar or like element 47 sliding freely in the groove 46 and projecting radially beyond the head into proximity of the cylindrical wall of the recess 34 and forming narrow clearances 48 with the casing, as best shown in Figs. 3 and 4. The portions of the bar 47 projecting beyond the head are located between adjacent end faces of the segments 43 and 44 and together with these segments form four spaces or chambers 49, 50, 51 and 52 on opposite sides of the bar 47.

The arrangement so far described is similar to a mechanical coupling and broadly comprises a coupling half secured to the driving element, which coupling half in the present instance is the head 41 with the bar 47 and a driven element which is the casing 30 forming a recess or chamber for receiving the crossbar 37. However, in contrast to an ordinary mechanical coupling the clearance between the crossbar and the adjacent surfaces of the driven element is much greater in applicant's arrangement. These clearances actually constitute the aforementioned chambers 49 to 52. Torque is transmitted from the crossbar to the adjacent faces of the driven element, that is, to the end faces of the segments 43 through the intermediary of a fluid such as oil filling the chambers 49 to 52. The oil-filled chambers broadly constitute flexible cushions between the driving and driven elements. Oil is conducted to the aforementioned chambers from a source of oil under pressure, not shown, through a channel 53 formed in the bracket 38 which communicates through a bore 54 in the cylindrical support 37 with an annular groove 55 in the inner cylindrical surface of the support 37. The groove 55 in turn communicates through a plurality of radial bores 56 through the bearing backing 35 and the lining 36 with an annular recess 57 in the outer surface of the casing 30. The recess 57 is connected by two diametrically opposite vertical bores 58 and 59. Two diametrically opposite ports 60 and 61 are formed in the segments 43 and 44 respectively. The head 41 and the segments 43 and 44 are concentrically spaced to form a very restricted clearance 62. Thus, oil may be normally supplied from the port 60 through the clearance 62 to the chambers 49 and 52. Likewise, oil under pressure is normally supplied from the port 61 through the clearance 62 to the chambers 50 and 51. During normal operating conditions, as pointed out above, all of the chambers 49 to 52 remain filled with oil under pressure, thereby to form a flexible hydraulic connection between the driving and driven coupling halves.

It is desirable to maintain the crossbar 47 in or near a central or symmetrical position between adjacent faces of the segments 43, 44 or, from another viewpoint, to maintain all of the chambers 49 to 52 inclusive uniformly filled with oil under pressure. To this end means are provided in my arrangement whereby oil may be discharged from some of the chambers and simultaneously supplied to other chambers or, from another viewpoint, the restriction to flow of oil through the chambers may be varied as the crossbar leaves its central position, as may occur during sudden speed changes of the driving element. To this end four ports 63, 64, 65 and 66 are formed in the head 41 and connected by channels to the chambers 49, 50, 51 and 52 respectively. The channel for connecting port 66 to the chamber 52 includes a bore 67 and a recess 68 in the side wall of the groove 46 adjacent the bar 49. Oil may be discharged from the chambers 49 or 50 in certain positions of the crossbar through a discharge channel or drain port 69 (Figs. 3 and 4) and oil may be discharged from the chambers 51 or 52 in certain relative positions of the crossbar 47 through a drain port or channel 70. The drain channels 69 and 70 are normally covered or cut off by the lower surface of the crossbar, as indicated in Fig. 3, and the ports 63 to 66, as shown in Fig. 3, are normally in a substantially symmetrical position, permitting uniform flow of fluid from the supply ports 60 and 61 through the clearance 62 and the ports 63 to 66 to the chambers 49 to 52 neglecting fluid loss due to leakage under the crossbar 47 into the port 69 and 70. The transmission of torque through the coupling causes slight displacement of the crossbar from its symmetrical position shown in Fig. 3, thereby displacing some of the liquid in the chambers 49 and 51 and setting up a pressure differential between the chambers 49 and 50 and 51 and 52.

If during operation the driving element with the crossbar 47 is rotated in clockwise direction when viewed in Fig. 3 and its speed is suddenly increased, oil under pressure or like operating fluid will be forced out of the chambers 49 and 51. Some of the fluid may be displaced from the chamber 51 through the clearance 48 formed between the casing and the end of the crossbar into the chamber 52. Similarly, fluid may be displaced from the chamber 49 into the chamber 50. As this occurs, an increased angular displacement between the driving and the driven elements takes place whereby the port 63 is moved towards the supply port 60 and the port 65 is moved towards the supply port 61, thereby reducing the resistance to flow of fluid from the ports 60 and 61 to the chambers 49 and 51 respectively. As the port 63 registers with the port 60, a considerable amount of fluid is conducted to the chamber 49 and likewise, as the port 65 registers with the port 61, an increased amount of fluid is conducted to the chamber 51, thus increasing the fluid pressure in the chambers 49 and 51. The supply of fluid to the other chambers 50 and 52 is not increased. Moreover, as the displacement between the driving and the driven elements reaches a certain magnitude, the crossbar uncovers the ports 69 and 70 to cause draining or free egress of fluid from the chamber 52 through the drain channels 70 and from the chamber 50 through the drain channel 69, thus reducing the fluid pressure in the chambers 50 and 52 to a minimum. An increased supply of fluid to the chambers 49 and 51 at constant or reduced fluid pressure in the chambers 50 and 52, however, causes alignment between the driving and the driven elements whereby the two elements assume their normal symmetrical position, as shown in Fig. 3.

Thus, with my invention I have accomplished an improved hydraulic coupling for transmitting torque between a driving and a driven element such as between an elastic fluid turbine or like machine and a speed governor for controlling an element of such machine in response to speed changes. A hydraulic coupling in accordance with my invention broadly comprises a first coupling half rotatably supported on a bearing and forming a cylindrical bore and recesses extending from the bore. A second coupling half is cooperatively associated with the first coupling half and includes a head located in the bore and projections extending from the head and located in the recesses to form therein chambers on opposite sides of the projections for receiving oil or other actuating fluid under pressure. The head and the cylindrical bore form a small clearance and oil under pressure is conducted through a port or ports in the first coupling half through such clearance to the chambers. Normally, the projections are centrally located in the recesses and uniform oil pressure is maintained in the chambers. During sudden speed change of the driving element an angular displacement takes place between the two coupling halves. Means are provided whereby the coupling halves are returned to their normal fixed angular relative position. This means includes ports formed in the head for increasing the fluid flow to some of the chambers and another port or ports formed in one of the coupling halves and normally covered or cut off by said projection or projections for draining fluid from some of the chambers upon displacement between the coupling halves.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Hydraulic coupling comprising a first coupling half forming a recess, a second coupling half having an element located in the recess and defining therewith chambers on opposite sides of the element, means including channels formed in one of the halves for conducting fluid under pressure to the chambers, and means including a port formed in the first half and normally covered by said element for draining fluid from the chambers in response to relative movement between the halves.

2. Hydraulic coupling comprising a coupling half forming a recess, another coupling half in cooperative relation with the first coupling half and having an element located in the recess to define chambers on opposite sides of the element, means for conducting fluid under pressure to the chambers, and a drain port formed in one of the coupling halves for draining fluid from the chambers, said drain port being normally covered by said element to control the draining of fluid from one of the chambers in response to relative movement between the two coupling halves.

3. Hydraulic coupling comprising a first coupling half forming a recess, a second coupling half in cooperative relation with the first coupling half and having an element located in the recess to define chambers on opposite sides of the element, means including a channel formed in the first coupling half and ports formed in the second coupling half for conducting fluid under pressure to the chamber, and a port formed in the first coupling half and normally cut off by said element to drain fluid from the chambers, the ports being arranged normally to maintain equal pressure in both chambers and upon relative movement between the two coupling halves to increase the pressure in one chamber and simultaneously to drain fluid from the other chamber in order to retain the two coupling halves in a predetermined relative position.

4. Hydraulic coupling comprising a first coupling half having a cylindrical bore and diametrically opposite recesses extending from the bore, a second coupling half having a head located in the bore and projections formed on the head and located in the recesses and forming chambers on opposite sides thereof, and means including ports formed in the coupling halves for conducting fluid under pressure to the chambers and other ports formed in the first half and in cooperative relation with the projections for draining fluid from the chambers in response to relative movement between the coupling halves.

5. Hydraulic coupling comprising a first coupling half having a central cylindrical opening and recesses extending from the opening, a bearing for rotatably supporting the first coupling half, a second coupling half having a head forming a small clearance with the cylindrical opening and projections formed on the head and disposed in the recesses to define chambers on opposite sides of each projection, means including ports formed in the first coupling half for conducting fluid under pressure through said clearance to the chambers, and means including ports formed in the head for increasing the fluid flow to at least one of the chambers in response to relative movement between the two coupling halves.

6. Hydraulic coupling comprising a first coupling half having a central cylindrical opening and recesses extending from the opening, a bearing for rotatably supporting the first coupling half, a second coupling half having a head forming a small clearance with the cylindrical opening and projections formed on the head and disposed in the recesses to define chambers on opposite sides of each projection, means including ports formed in the first coupling half for conducting fluid under pressure through said clearance to the chambers, means including ports formed in the head for increasing the fluid flow to at least one of the chambers in response to relative movement between the two coupling halves, and means including a drain port in one of the coupling halves for draining fluid from at least one of the chambers in response to relative movement between the coupling halves.

7. Hydraulic coupling comprising a first coupling half having a central cylindrical opening and recesses extending from the opening, a bearing for rotatably supporting the first coupling half, a second coupling half having a head forming a small clearance with the cylindrical opening and projections formed on the head and symmetrically disposed in the recesses to define chambers on opposite sides of each projection, means including diametrically opposite ports in the first coupling half for conducting fluid under pressure through said clearance into said chambers normally to maintain the two coupling halves in a fixed relative angular position, and means for varying the fluid flow to the chambers to restore such fixed relative angular position of the two coupling halves upon angular displacement between them.

8. Hydraulic coupling comprising a first coupling half having a central cylindrical opening and recesses extending from the opening, a second coupling half having a head forming a small clearance with the cylindrical opening and projections formed on the head and disposed in the recesses to define chambers on opposite sides of each projection, means including ports in the first coupling half for conducting fluid under pressure through said clearance into said chambers normally to maintain the two coupling halves in a fixed relative angular position, and means for varying the oil flow to the different chambers to restore such fixed relative angular position of the two coupling halves upon angular displacement between them, said last means comprising ports formed in the head to increase the fluid flow to some of the chambers upon angular movement between the coupling halves and other ports formed in the first coupling half and normally cut off by the projections to drain fluid from some of the chambers upon relative movement between the coupling halves.

SIDNEY O. HUNTINGTON.